(12) United States Patent
Naito et al.

(10) Patent No.: US 6,850,480 B1
(45) Date of Patent: Feb. 1, 2005

(54) RECORDING MEDIUM, RECORDING APPARATUS AND RECORDING METHOD

(75) Inventors: Katsuyuki Naito, Tokyo (JP); Hiroyuki Hieda, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 642 days.

(21) Appl. No.: 09/652,010

(22) Filed: Aug. 31, 2000

(30) Foreign Application Priority Data

Sep. 29, 1999 (JP) .......................................... 11-277456

(51) Int. Cl.[7] .................................................. G11B 7/00
(52) U.S. Cl. ..................................... 369/288; 369/126
(58) Field of Search ................................ 369/276, 284, 369/288, 13.33, 13.35, 13.38, 13.39, 13.4, 13.41, 94, 126, 275.1

(56) References Cited

U.S. PATENT DOCUMENTS

| | | | |
|---|---|---|---|
| 3,801,966 A | | 4/1974 | Terao |
| 4,701,880 A | | 10/1987 | Ichihara |
| 4,956,714 A | | 9/1990 | Takanashi et al. |
| 5,027,216 A | | 6/1991 | Takanashi et al. |
| 5,162,819 A | | 11/1992 | Sakai et al. |
| 5,270,995 A | | 12/1993 | Wada et al. |
| 5,389,475 A | * | 2/1995 | Yanagisawa et al. .......... 430/19 |
| 5,479,384 A | | 12/1995 | Toth et al. |
| 5,675,532 A | | 10/1997 | Gemma et al. |
| 6,125,095 A | | 9/2000 | Gemma et al. |
| 6,197,399 B1 | | 3/2001 | Naito et al. |
| 6,544,716 B1 | * | 4/2003 | Hajjar et al. .............. 369/275.5 |
| 6,552,968 B1 | * | 4/2003 | Kishima et al. .......... 369/13.38 |
| 6,600,714 B2 | * | 7/2003 | Ichimura et al. .......... 369/275.1 |
| 6,614,746 B1 | * | 9/2003 | Tanaka et al. .............. 369/126 |
| 6,621,787 B1 | * | 9/2003 | Lee et al. ................. 369/275.1 |

FOREIGN PATENT DOCUMENTS

| | | |
|---|---|---|
| JP | 57-123541 | 8/1982 |
| JP | 2-125264 | 5/1990 |
| JP | 2-127649 | 5/1990 |
| JP | 2-250473 | 10/1990 |
| JP | 7-254153 | 10/1995 |
| JP | 8-045122 | 2/1996 |
| JP | 10-172166 | 6/1998 |

OTHER PUBLICATIONS

Patent Abstracts of Japan, JP 60–212843, Oct. 25, 1985.
Patent Abstracts of Japan, JP 57–135445, Aug. 21, 1982.
Patent Abstracts of Japan, JP 10–289496, Oct. 27, 1998.
C. Liu, et al., Science, vol. 261, pps. 897–899, "High–Density Nanosecond Charge Trapping In Thin Films of The Photoconductor ZnODEP," Aug. 13, 1993.
E. Betzig, et al., Appl. Phys. Lett., vol. 61, No. 2, pps. 142–144, "Near–Field Magneto–Optics and High Density Data Storage," Jul. 13, 1992.
S. Hosaka, et al., Thin Sold Films, vol. 273, pps. 122–127, "Scanning Near–Field Optical Microscope With A Laser Diode and Nanometer–Sized Bit Recording," 1996.
S. Hosaka, et al., J. Appl. Phys., vol. 79, No. 10, pps. 8082–8086, "Phase Change Recording Using a Scanning Near–Field Optical Microscope," May 15, 1996.

* cited by examiner

Primary Examiner—Thang V. Tran
Assistant Examiner—Bach Q. Vuong
(74) Attorney, Agent, or Firm—Oblon, Spivak, McClelland, Maier & Neustadt, P.C.

(57) ABSTRACT

The present invention provides a recording medium having a plurality of charge accumulating regions each containing a first material capable of accumulating an electric charge and a photoconductive region containing a second material whose conductivity is increased by light absorption, a recording apparatus including such a recording medium, and a method recording information on such a recording medium. In the present invention, information is recorded on the recording medium by irradiating the photoconductive region with light and by injecting an electric charge into the charge accumulating region via that portion of the photoconductive region which is irradiated with light.

18 Claims, 3 Drawing Sheets

RECORDING MEDIUM, RECORDING APPARATUS AND RECORDING METHOD

CROSS-REFERENCE TO RELATED APPLICATIONS

This application is based upon and claims the benefit of priority from the prior Japanese Patent Application No. 11-277456, filed Sep. 29, 1999, the entire contents of which are incorporated herein by reference.

BACKGROUND OF THE INVENTION

The present invention relates to a recording medium, a recording apparatus and a recording method.

In the information society in recent years, the amount of information is on a sharp increase. Therefore, it is of very high importance to develop a recording method or a recording apparatus capable of drastically improving the recording density, compared with the prior art.

As a technology for realizing a high recording density, attentions are paid to an optical recording such as a heat mode recording in which light is converted into heat for performing the recording or a photon mode recording in which recording is performed without converting light into heat.

As a heat mode recording, a magneto-optic recording or a phase transition recording has already been put to a practical use. In such a technology, however, a drastically high recording density has not yet been realized. Therefore, in order to improve the recording density in such a heat mode recording, proposed is a technology utilizing a Near-field Scanning Optical Microscope (NSOM) capable of forming a recording mark smaller than a wavelength of light.

For example, it is reported in "Appl. Phys. Lett. 61, 142 (1992)" that Betzig et al. irradiated a Co/Pt multi-layered film with an output of an Ar ion laser by using an NSOM probe in an attempt to magneto-optically record/reproduce information, thereby forming a recording mark having a diameter of about 60 nm. It is also reported in "Thin Solid Films 273,122 (1996)" and "J. Appl. Phys. 79,8082 (1996)" that Hosaka et al. irradiated a $Ge_2Sb_2Te_5$ thin film having a thickness of about 30 nm with an output of a semiconductor layer by using an NSOM probe, thereby forming a recording mark having a diameter of about 50 nm.

In these methods, however, the recording mark is enlarged by the diffusion of heat. In addition, the energy required for the recording is large. Therefore, it is considered impossible to realize a recording density on the order of terabits/cm², which requires recording marks of about 10 nm.

Japanese Patent Disclosure (Kokai) No. 7-254153 discloses a recording medium for another heat mode recording, in which the recording is performed by utilizing the change in phase of an organic dye, and the recorded data is read out by detecting fluorescence. According to this recording medium, the recording mark can be diminished by using an organic dye molecule having a low heat conductivity. However, it is difficult to achieve a recording density on the order of terabits/cm², which requires a recording mark of about 10 nm, in this method, too. Also, in this recording medium, the amorphous region corresponding to the recording mark is contiguous to the crystal region, with the result that the amorphous region tends to be crystallized. In other words, the recording tends to be broken. Further, since the recording layer has a uniform composition in the recording medium, the difference in signal intensity is small between the crystal region and the amorphous region, giving rise to a large noise.

The problem of noise generation takes place not only in the heat mode recording medium but also in the photon mode recording medium having a uniform composition in the recording layer.

Concerning the photon mode recording, Japanese Patent Disclosure No. 8-45122 discloses a recording medium, in which dot-like (domain structure) recording region consisting of an organic dye molecule and having a diameter of about 10 to 100 nm is formed on a substrate, and the recording is performed by injecting an electric charge into the recording region. In this recording medium, a single dot corresponds to a recording unit (1 bit), making it possible to achieve a high recording density. However, in this recording medium, it is difficult to form dot-like recording regions of a uniform size and to arrange regularly the dot-like recording regions. In addition, the size and arrangement of the dot-like recording regions tend to be changed with time. Further, since it is necessary to bring an electrode into contact with the dot-like recording region when an electric charge is injected into the dot-like recording region and when the electric charge is discharged from the dot-like recording region, it is necessary for that surface of the recording medium on which the dot-like recording regions are formed to be smooth. However, it is generally difficult to achieve the required smoothness. Also, even if the required surface smoothness is achieved by forming a protective layer on that surface of the recording medium on which the dot-like recording regions are formed, a new problem is brought about that a high voltage is required for injecting and discharging electric charges into and from the recording regions.

As described above, various problems remain unsolved in the conventional recording technology that it is impossible to form a small recording mark, that a large energy is required for the recording of information and for the reproduction of recorded information, that the recorded information tends to be broken, that a large noise is generated, and that it is difficult to make the surface of the recording layer smooth. Also, where a smooth surface is realized by forming a protective layer on the recording surface, a high voltage is required for the injection and discharge of the electric charges. Under the circumstances, a recording technology capable of achieving a super high recording density has not yet been put to a practical use.

BRIEF SUMMARY OF THE INVENTION

An object of the present invention is to provide a recording medium, a recording apparatus and a recording method capable of achieving a super high recording density.

Another object is to provide a recording medium, a recording apparatus and a recording method capable of achieving a super high recording density and also capable of recording information with a relatively low voltage.

According to a first aspect of the present invention, there is provided a recording medium, comprising a substrate, a recording layer overlying the substrate and having a plurality of charge accumulating regions each containing a first material capable of accumulating an electric charge, and a photoconductive layer formed on the recording layer and having a photoconductive region containing a second material whose conductivity is increased by light absorption.

According to a second aspect of the present invention, there is provided a recording medium, comprising a substrate, a conductive layer overlying the substrate, a photoconductive layer formed on the conductive layer and containing a second material whose conductivity is increased by light absorption, and a recording layer formed on the photoconductive layer and having a plurality of charge accumulating regions each containing a first material capable of accumulating an electric charge.

According to a third aspect of the present invention, there is provided a recording medium, comprising a substrate, and a recording layer overlying the substrate and having a plurality of charge accumulating regions each containing a first material capable of accumulating an electric charge and a photoconductive region containing a second material whose conductivity is increased by light absorption.

According to a fourth aspect of the present invention, there is provided a recording apparatus, comprising a recording medium including a substrate and a recording layer overlying the substrate and having a plurality of charge accumulating regions each containing a first material capable of accumulating an electric charge, the recording layer further including a photoconductive region containing a second material whose conductivity is increased by light absorption or the recording medium further including a photoconductive layer in contact with the recording layer and having the photoconductive region, and a recording head arranged to face the main surface of the recording medium and comprising a light emitting section emitting light toward the recording layer and an electrode being adjacent to the light emitting section and utilized in injecting an electric charge into at least one of the plural charge accumulating regions.

According to a fifth aspect of the present invention, there is provided a recording apparatus, comprising any one of the recording media and a recording head arranged to face the main surface of the recording medium.

According to a sixth aspect of the present invention, there is provided a recording apparatus, comprising any one of the recording media, and a recording head including a light emitting section arranged to face the main surface of the recording medium and an electrode adjacent to the light emitting section.

Further, according to a seventh aspect of the present invention, there is provided a recording method of recording information by injecting an electric charge into a charge accumulating region containing a first material capable of accumulating the charge, comprising the steps of irradiating a photoconductive region arranged in contact with the charge accumulating region and containing a second material whose conductivity is increased by light absorption, and injecting an electric charge into the charge accumulating region via a portion of the photoconductive region irradiated with light.

The term "region" used in the present invention denotes a three dimensional region unlike an interface or a surface and is used mainly for representing the entire thin film having a single layer structure or a part of such a single layer. Where the term "region" is used in conjunction with a part of the thin film having a single layer structure, the "part" denotes, for example, a dispersing medium (continuous phase) or a dispersed phase (fine particle) in a dispersion system, a thin film having a through-hole, a material loading the through-hole, a thin film having a recessed portion on the surface or a material filling the recessed portion. Incidentally, the term "region" does not imply the concept of size and can be used over a wide rage including the size of the molecule level and the size of the thin film.

In the present invention, the first material capable of accumulating the charge includes electron donative or acceptive organic materials, metals, alloys, semiconductors and dielectrics. Also, the second material used in the present invention, which is not particularly limited as far as the conductivity is increased by light absorption, is generally provided by a material that is an insulator when the material is not irradiated with light and is converted into a conductive material upon irradiation with light. In the case of using a material whose conductivity is non-linearly changed in accordance with the intensity of the light as the second material, it is possible to achieve a higher recording density.

Where the recording medium of the present invention is of a laminate structure of a recording layer and a photoconductive layer, the recording layer generally includes a plurality of charge accumulating regions and at least one electrically insulating region for electrically insulating the charge accumulating regions from each other. In this case, it is possible for the recording layer to be constructed such that a plurality of charge accumulating regions and at least one electrically insulating region are juxtaposed on the substrate. Also, it is possible for the recording layer to be constructed such that at least one electrically insulating region forms at least a part of the dispersing medium and the plural charge accumulating regions are dispersed in the dispersing medium. Further, it is possible for the recording layer to be constructed such that the recording layer includes an insulating layer having a plurality of recessed portions on the surface thereof as at least one electrically insulating region and a plurality of charge accumulating regions fills the plural recessed portions.

In the present invention, where the recording medium is of a laminate structure that a recording layer and a photoconductive layer are stacked on the substrate in the order mentioned, it is possible for the recording medium to further comprise a conductive layer interposed between the substrate and the recording layer, and an insulating layer interposed between the conductive layer and the recording layer. Also, where the recording layer includes both the charge accumulating region and the photoconductive region in the present invention, it is possible for the recording medium to further comprise a conductive layer interposed between the substrate and the recording layer and an insulating layer interposed between the conductive layer and the recording layer.

In the recording apparatus of the present invention, it is desirable for the light emitting section to emit a near field light as the light. Also, it is possible for the recording apparatus of the present invention to further comprise a reproducing head arranged to face the main surface of the recording medium and serving to read information in accordance with the amount of charge accumulated in each of the plural charge accumulating regions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
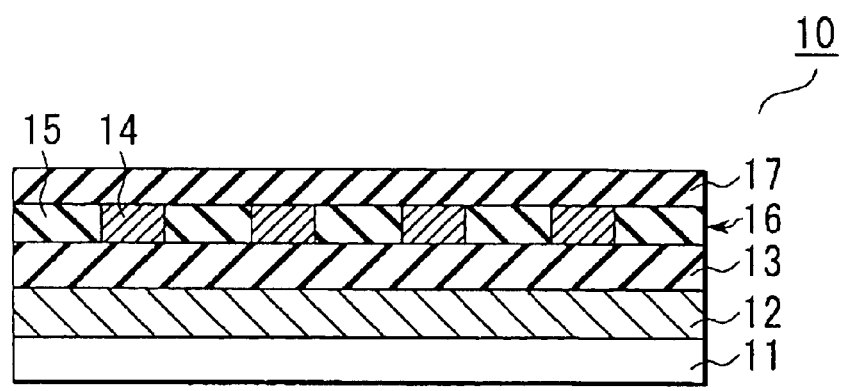
FIG. 1 is a cross-sectional view schematically showing a recording medium according to a first embodiment of the present invention.

The present invention will now be described in detail with reference to the accompanying drawings. Incidentally, the same or analogous members of the apparatus are denoted by the same reference numerals throughout the drawings so as to omit an overlapping description.

FIG. 1 is a cross sectional view schematically showing a recording medium 10 according to a first embodiment of the present invention. As shown in the drawing, the recording medium 10 is of a laminate structure that a conductive layer 12, an insulating layer 13, a recording layer 16, and a photoconductive layer 17 are stacked on a substrate 11 in the order mentioned. In the recording medium 10 shown in the drawing, the recording layer 16 has a structure that a plurality of charge accumulating regions 14 and an electrically insulating region 15 are juxtaposed on the insulating layer 13, such that the adjacent charge accumulating regions 14 are electrically insulated from each other by the presence of the electrically insulating region 15 interposed between these adjacent charge accumulating regions 14. In this embodiment, each of these charge accumulating regions 14 corresponds to one bit.

As will be described herein later in detail, an electric charge can be injected into and discharged from each of these charge accumulating regions 14 to allow these charge accumulating regions 14 to assume the state that an amount of charge accumulated is larger and the state that an amount of charge accumulated is smaller. It follows that information "0" and "1" can be recorded by utilizing these two states in the recording medium 10 shown in FIG. 1.

The recording medium 10 shown in FIG. 1 can be manufactured by, for example, the method described below.

In the first step, a glass disc having an optical figured main surface and having a diameter of about 120 mm and a thickness of about 1.2 mm is prepared as the substrate 11. The substrate 11 is not particularly limited, as far as the substrate has a smooth surface. To be more specific, the material forming the substrate 11 may be a conductor, a semiconductor, an insulator or a composite material thereof. Also, the substrate 11 may be either transparent or opaque.

In the next step, as the conductive layer 12, an Al film having a thickness of about 200 nm is formed by vapor deposition on the optical figured surface of the substrate 11. The material forming the conductive layer 12 is not particularly limited as far as the material exhibits conductivity. The conductive layer 12 and the insulating layer 13 formed on the conductive layer 12 are not indispensable in this embodiment. However, where the conductive layer 12 and the insulating layer 13 are formed, the recorded information can be stabilized more sufficiently. Incidentally, where the mirror polished surface of the substrate 11 is conductive, the conductive layer 12 need not be formed.

As the insulating layer 13, an $SiO_2$ film having a thickness of about 200 nm is formed by a sputtering method on the conductive layer 12. The material forming the insulating layer 13 is not particularly limited, as far as the material exhibits electrically insulating properties.

Then, a resist film having a thickness of about 50 nm is formed on the insulating layer 13 by spin coating of polydiisobutyl fumarate, which is an electron resist, followed by irradiating the resist film with an electron beam in a predetermined pattern by using an EB depicting apparatus. Further, the resist film after the EB depiction is developed with an ethanol, thereby obtaining a thin film having a plurality of through-holes as an electrically insulating region 15. In this step, the electrically insulating region 15 is formed such that each of these through-holes has a circular opening having a diameter of about 30 nm, and that the distance between the centers of the adjacent through-holes is about 50 nm.

In the next step, electron donative organic dye molecules having a chemical structure given in chemical formula (1) are evaporated onto the entire surface of the substrate having the electrically insulating regions 15 formed thereon in advance. Then, the substrate having the film of the organic dye molecules formed thereon is heated at about 80° C. for about one hour under a nitrogen gas atmosphere. The electron donative organic dye molecules deposited by vapor deposition on the upper surface of the electrically insulating region 15 flows into the through-hole by the heating to form the charge accumulating region 14 within the through-holes. As a result, obtained is the recording layer 16 having the charge accumulating regions 14 and the electrically insulating regions 15.

It is desirable for the thickness of the recording layer 16 to be about 10 nm to about 100 nm. It is desirable for the recording layer 16 to be capable of accumulating a sufficiently large amount of charge in the charge accumulating region 14 and capable of achieving a high resolution. In general, a sufficiently large amount of electric charge can be accumulated in the charge accumulating region 4 where the recording layer 16 has a thickness of about 10 nm or more. Also, where the thickness of the recording layer 16 is not larger than about 100 nm, a high resolution can be achieved.

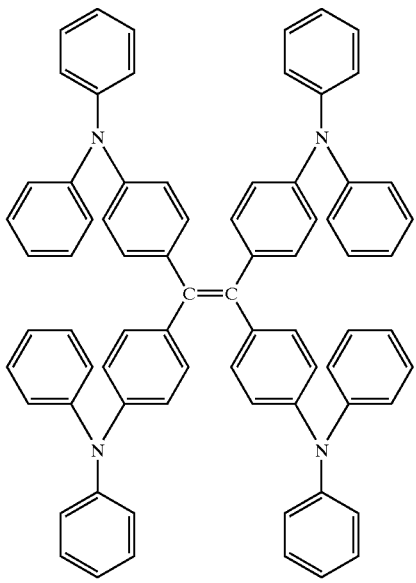

(I)

The photoconductive layer 17 having a thickness of about 50 nm, which consists of the compound having a chemical structure (2) given below, is formed on the recording layer 16 by a spin coating method. It is desirable for the photoconductive layer 17 to have a thickness falling within a range of between about 5 nm and about 100 nm. It is desirable for the photoconductive layer 17 to be sufficiently insulating when the layer 17 is not irradiated with light and to be sufficiently conductive when irradiated with light. In general, where the thickness of the photoconductive layer 17 is at least about 5 nm, sufficient insulating properties can be obtained when the layer 17 is not irradiated with light. Also, where the thickness of the photoconductive layer 17 is not thicker than about 100 nm, a sufficient conductivity can be obtained when the layer 17 is irradiated with light.

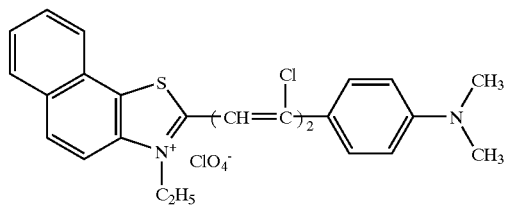

(2)

Figure 2A:
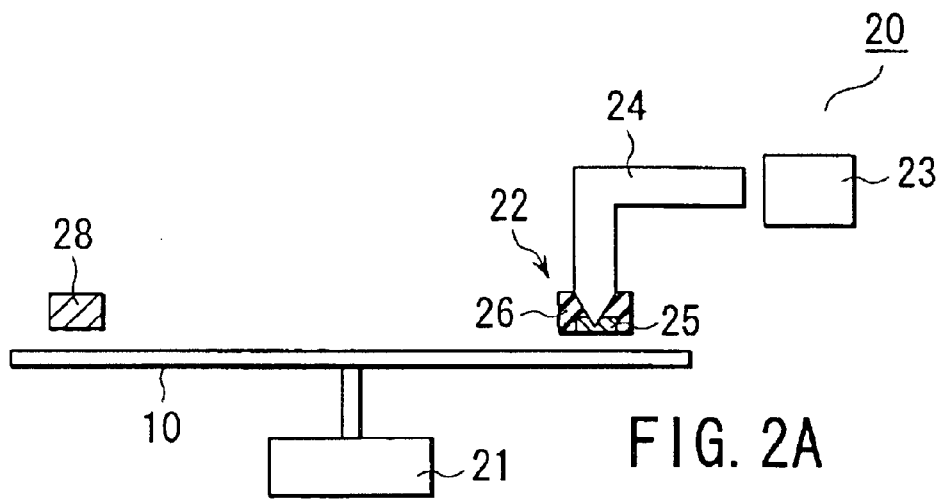
FIG. 2A is a view schematically showing the recording-reproducing apparatus according to the first embodiment of the present invention.
Figure 2B:
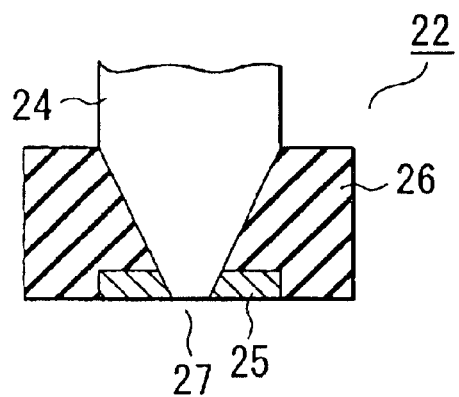
FIG. 2B is a magnified view showing a part of the recording-reproducing apparatus of FIG. 2A.

Writing of the information on the recording medium 10 thus obtained and reading and erasing the information recorded on the recording medium 10 can be performed by using an apparatus as shown in FIGS. 2A and 2B.

Specifically, FIG. 2A schematically shows a recording-reproducing apparatus 20 according to one embodiment of the present invention. On the other hand, FIG. 2B shows in a magnified fashion a part of the recording-reproducing apparatus shown in FIG. 2A. Further, FIG. 3 is an oblique view exemplifying a reproducing head 28 included in the recording-reproducing apparatus shown in FIG. 2A.

The recording-reproducing apparatus 20 shown in FIG. 2A has a motor 21 for rotating the recording medium 10, a recording head 22 arranged to face the recording medium 10, an optical fiber 24 connected at one end to the recording head 22, a semiconductor laser 23 connected to the other end of the optical fiber 24, and the reproducing head 28. In the recording-reproducing apparatus 20, the recording medium 10 is arranged such that the photoconductive layer 17 of the recording medium 10 faces the recording head 22 and the reproducing head 28. It is possible for the recording medium 10 to be a constituent of the recording-reproducing apparatus 20 or not to be a constituent of the recording-reproducing apparatus 20. In other words, it is possible for the recording medium 10 to be non-removable as in the ordinary HDD or to be removable as the DVD-RAM.

As shown in FIG. 2B, the recording head 22 has a mount 26 through which extends the optical fiber 26. The optical fiber 24 is tapered within the mount 26 toward the recording medium 10, and an opening 27 is formed at the tip on the side of the recording medium 10. An electrode 25 is arranged to surround the opening 27 of the mount 26 on the side of the recording medium 10. The recording head 22, which is used for writing information in the recording medium 10, can also be used for erasing the information recorded in the recording medium 10.

Figure 3:
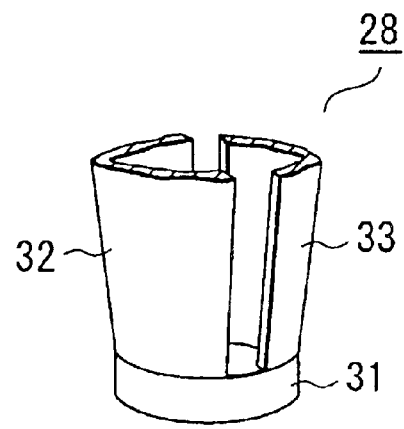
FIG. 3 is an oblique view schematically showing an example of a reproducing head of the recording-reproducing apparatus shown in FIG. 2A.

A mirco-FET sensor head as shown in FIG. 3 can be used as the reproducing head 28. The mirco-FET sensor head 28 has, for example, a semiconductor layer 31 consisting of Si doped with an impurity and a source 32 and a drain 33 each connected to the semiconductor layer 31.

Information is recorded on the recording medium 10 by using the recording-reproducing apparatus 20, for example, as follows. Specifically, the recording medium 10 is irradiated with a laser light having a wavelength of about 620 nm and emitted from a semiconductor laser 23 having an output of about 1 mW through the optical fiber 24 as a near field light, with the electrode 25 of the recording head 22 kept in contact with the photoconductive layer 17, while rotating the disc-like recording medium 10 at a speed of about 4,000 rpm by operating the motor 21. In this example, the diameter of the opening 27 of the optical fiber is about 30 nm. Also, the recording head 22 is moved in the radial direction so as to permit the recording medium 10 to be irradiated with the near field light in a spiral form.

If a pulse voltage of about 10V corresponding to the information to be recorded is applied in this step to the electrode 25, the conductivity is increased in that region of the photoconductive layer 17 which is irradiated with the near field light, though that region of the photoconductive layer 17 which is not irradiated with the near field light remains to be an insulator. As a result, a positive charge is injected into only that region of the charge accumulating region 14 which is irradiated with the near field light and to which voltage is applied. In this fashion, information is recorded on the recording medium 10.

The information thus recorded can be reproduced by using the mirco-FET sensor head 28 described above. To be more specific, the recording medium 10 is rotated with the semiconductor layer 31 of the mirco-FET sensor head 28 kept slightly apart from the photoconductive layer 17 of the recording medium 10 so as to observe the change in the current flow between the source 28 and the drain 33 of the mirco-FET sensor 28. Since the electric field formed by the charge accumulated in the charge accumulating regions 14 acts on the semiconductor layer 31 of the mirco-FET sensor head 28, the charge accumulating regions 14 behave as a gate electrode of the mirco-FET sensor head 28. In other words, the current flowing between the source 32 and the drain 33 of the mirco-FET sensor head 28 is changed in accordance with the amount of charge accumulated in the charge accumulating regions 14. It follows that the information recorded on the recording medium 10 can be read out by the particular method.

Incidentally, the recording medium 10 having information recorded thereon by the method described above was left to stand at about 80° C. for about one week, followed by reproducing the recorded information by using the mirco-FET sensor head 28. As a result, the amount of charge stored in the charge accumulating region 14 was decreased by about 5%, compared with the amount immediately after the recording. However, it was possible to obtain about 30 dB of S/N ratio. In other words, it has been confirmed that the information recorded on the recording medium 10 can be retained with a high stability.

Also, the information recorded on the recording medium 10 can be erased, for example, as follows. Specifically, the recording medium 10 is irradiated with a laser light emitted from the semiconductor laser 23 through the optical fiber 24 as a near field light, with the electrode 25 of the recording head 22 kept in contact with the photoconductive layer 17, while rotating the recording medium 10 at about 4,000 rpm by operating the motor 21. At the same time, a pulse voltage of about −3V is applied to the electrode 25. Incidentally, the recording head 22 is moved in the radial direction so as to permit the recording medium 10 to be irradiated in a spiral form with a near field light. By the particular operation, the positive charge stored in the charge accumulating regions 14 is discharged through the photoconductive layer 17 and the electrode 25 by the principle equal to that described previously in conjunction with the information recording. In this fashion, it is possible to erase the information recorded on the recording medium 10. The recorded information was actually erased by the method described above, followed by reproducing the information by using the mirco-FET sensor head. It has been confirmed that the information has been completely erased.

In addition to the recording and erasure of information described above, it is also possible to perform an over-write recording on the recording medium 10. For example, a pulse voltage of 10V corresponding to the information to be newly recorded is superposed on a pulse voltage of −3V for erasing the information already recorded on the recording medium 10, and the resultant pulse voltage is applied to the electrode 25 so as to carry out simultaneously the erasure of the information that is already recorded and the recording of the new information.

As described above, this embodiment utilizes the phenomenon that the electrical resistance is lowered in only the region irradiated with a near field light. Therefore, even if the electrode 25 is large, the charge can be selectively injected in a desired charge accumulating region 14. Also, since the electrical resistance is lowered in that region of the photoconductive layer 17 which is irradiated with the near field light, a high voltage in not required for injecting the charge into the charge accumulating region 14.

It should also be noted that, since the photoconductive layer 17 has a sufficiently high resistance value, it is substantially impossible for the charge injected into the charge accumulating region 14 to be discharged to the outside through the photoconductive layer 17. Further, in this embodiment, the adjacent charge accumulating regions 14 are electrically insulated from each other by the electrically insulating region 15 interposed between these adjacent charge accumulating regions 14, with the result that the migration of charge does not take place between adjacent charge accumulating regions 14. What should also be noted is that, in this embodiment, the conductive layer 12 and the insulating layer 13 are interposed between the substrate 11 and the recording layer 16, with the result that a mirror charge opposite in polarity to the charge injected into the charge accumulating region 14 is accumulated in the conductive layer. It follows that, according to the recording medium 10 in this embodiment, the charge can be retained highly stably within the charge accumulating region 14 and a large amount of charge can be injected into the charge accumulating region 14. As a result, a high recording density can be achieved in the recording medium 10 in this embodiment.

Further, in the first embodiment described above, the photoconductive layer 17 is formed on the recording layer 16 and, thus, the recording medium 10 can have a smooth surface. In addition, since the photoconductive layer 17 is formed to cover the recording layer 16, it is possible for the photoconductive layer 17 to perform the function of a protective layer for protecting the recording layer 16 and the function of a lubricating film for decreasing the friction coefficient between the recording medium 10 and the recording head 22.

As described above, the opening 27 of the optical fiber 24 has a very small size in this embodiment, and the recording medium 10 is irradiated with a near field light through the opening 27. The near field light is the light that is localized on only the surface of a substance when the substance is irradiated with the light. In other words, the near field light represents the electric line of force between induced dipoles adjacent to each other in the vicinity of the surface among the induced dipoles generated within a substance when the substance is irradiated with light. In the case of using the near field light, it is possible to make the light irradiated spot very small. The method of generating the near field light, which is not particularly limited in the present invention, includes, for example, the method of using a probe having a very small opening as in the embodiment described above, the method using a solid immersion lens, the method utilizing a phase change material, in which the refractive index is non-linearly changed relative to the temperature like antimony, and the method utilizing the plasmon resonance of fine metal particles.

A second embodiment of the present invention will now be described.

Figure 4:
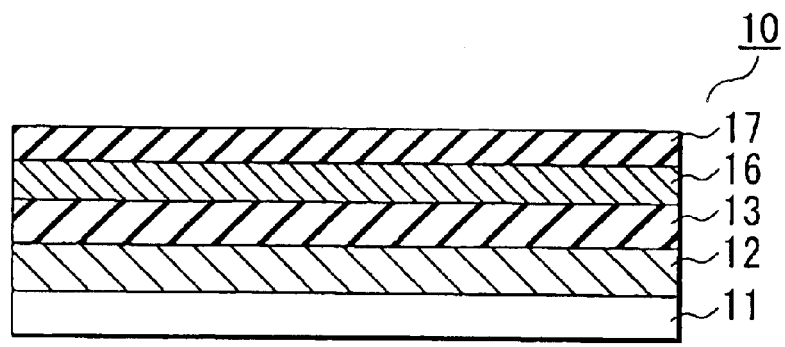
FIG. 4 is a cross sectional view schematically showing a recording medium according to a second embodiment of the present invention.

FIG. 4 is a cross sectional view schematically showing a recording medium 10 according to a second embodiment of the present invention. The recording medium 10 shown in FIG. 4 has a structure that a conductive layer 12, an insulating layer 13, a recording layer 16, and a photoconductive layer 17 are stacked on a substrate 11 in the order mentioned. In the recording medium 10 of the particular construction, the recording layer 16 is constructed such that a large number of fine charge accumulating regions (not shown) are uniformly dispersed in an electrically insulating region (not shown). Naturally, the adjacent charge accumulating regions are electrically insulated from each other by the electrically insulating region. In other words, the second embodiment differs from the first embodiment in the construction of the recording layer 16. Also, a plurality of charge accumulating regions correspond to one bit in the second embodiment.

The recording medium 10 shown in FIG. 4 can be manufactured, for example, as follows. In the first step, prepared is a glass disc having an optical figured main surface, and having a diameter of about 120 mm and a thickness of about 1.2 mm. Then, an Al film having a thickness of about 200 nm is formed as the conductive layer 12 by a vapor deposition method on the optical figured surface of the substrate 11. Further, an SiO$_2$ film having a thickness of about 200 nm is formed by a sputtering method as the insulating layer 13 on the conductive layer 12.

In the next step, the recording layer 16 having a thickness of about 100 nm is formed by a spin coating method on the insulating layer 13. The recording layer 16 is constructed such that electron acceptive organic dye molecules having a chemical structure (3) given below are dispersed in an insulating polystyrene. In the recording layer 16, the electrically insulating region is formed by the insulating polystyrene. Also, the charge accumulating regions are formed by the electron acceptive organic dye molecules having a chemical formula (3).

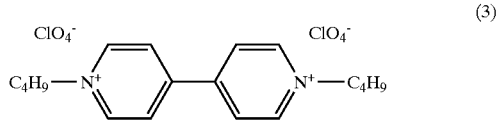

(3)

Further, the photoconductive layer 17 having a thickness of about 60 nm and made of the compound given by chemical formula (2) given previously is formed by a spin coating method on the recording layer 16, thereby obtaining the recording medium 10 shown in FIG. 4.

Information is recorded on the recording medium 10 by using, for example, the apparatus shown in FIG. 2A. Specifically, the recording medium 10 is irradiated with a laser light having a wavelength of about 620 nm and emitted from a semiconductor laser 23 having an output of about 1 mW through the optical fiber 24 as a near field light, with the electrode 25 of the recording head 22 kept in contact with the photoconductive layer 17, while rotating the disc-like recording medium 10 at a speed of about 5,000 rpm by operating the motor 21. In this example, the diameter of the opening 27 of the optical fiber is about 50 nm. Also, the recording head 22 is moved in the radial direction so as to permit the recording medium 10 to be irradiated with the near field light in a spiral form.

If a pulse voltage of about −10V corresponding to the information to be recorded is applied in this step to the electrode 25, the conductivity is increased in that region of the photoconductive layer 17 which is irradiated with the near field light, though that region of the photoconductive layer 17 which is not irradiated with the near field light remains to be an insulator. As a result, a negative charge is injected into only that region of the charge accumulating region which is irradiated with the near field light and to which voltage is applied. In this fashion, information is recorded on the recording medium 10.

The information thus recorded can be reproduced by the method similar to that employed in the first embodiment. Incidentally, the recording medium 10 having information recorded thereon by the method described above was left to stand at 80° C. for about one week, followed by reproducing the recorded information by using the mirco-FET sensor head 28. It has been found that the amount of charge accumulated in the charge accumulating region was decreased by about 10%, compared with the amount immediately after the information recording. However, about 30 dB of S/N ratio was obtained. In other words, it has been confirmed that the information recorded on the recording medium 10 can be retained with a high stability.

Also, the information recorded on the recording medium 10 can be erased, for example, as follows. Specifically, the recording medium 10 is irradiated with a laser light emitted from the semiconductor laser 23 through the optical fiber 24 as a near field light, with the electrode 25 of the recording head 22 kept in contact with the photoconductive layer 17 of the recording medium 10, while rotating the recording medium 10 at a speed of about 5,000 rpm by operating the motor 21. At the same time, a pulse voltage of about 4V is applied to the electrode 25. Incidentally, the recording head 22 is moved in the radial direction so as to permit the recording medium 10 to be irradiated with the near field light in a spiral form. By the particular operation, the negative charge accumulated in the charge accumulating region is discharged to the outside through the photoconductive layer 17 and the electrode 25 by the principle equal to that described previously in conjunction with the information recording. In this fashion, the information recorded on the recording medium 10 can be erased. The recorded information was actually erased by the particular method, followed by reproducing the information by using the mirco-FET sensor head 28. It has been found that the information was completely erased.

Also, an over-write recording can also be performed on the recording medium 10 shown in FIG. 4. For example, a pulse voltage of −10V corresponding to the information that is to be newly recorded is superposed with a pulse voltage of 4V for erasing the information recorded in advance, and the resultant pulse voltage is applied to the electrode 25. As a result, the erasure of the information recorded in advance and the recording of the new information can be performed simultaneously.

According to the second embodiment described above, it is possible to obtain effects similar to those obtained in the first embodiment. Also, in the second embodiment, the charge accumulating regions are uniformly dispersed in the electrically insulating region in the recording layer 16, making it possible to use a material, which tends to be crystallized easily and which is low in its film forming properties, for forming the charge accumulating regions. Further, since the recording layer 16 can be formed without using an electron beam depiction in the second embodiment, it is possible to achieve a high productivity.

A third embodiment of the present will now be described.

Figure 5:
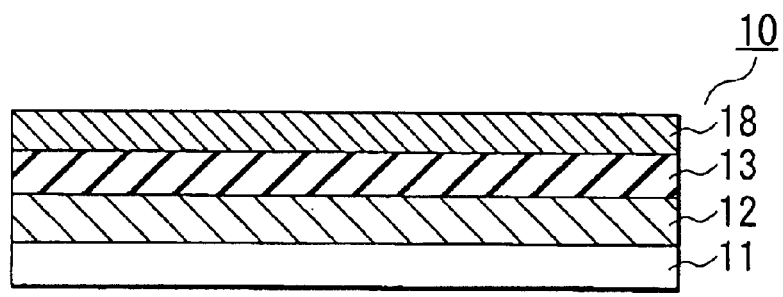
FIG. 5 is a cross sectional view schematically showing a recording medium according to a third embodiment of the present invention.

Specifically, FIG. 5 is a cross sectional view schematically showing the construction of a recording medium 10 according to the third embodiment of the present invention. As shown in the drawing, the recording medium 10 in this embodiment has a structure that a conductive layer 12, an insulating layer 13, and a photoconductive recording layer 18 are stacked on a substrate 11 in the order mentioned. The third embodiment differs from the first and second embodiments in that the photoconductive recording layer 18 is used in the third embodiment in place of the laminate structure of the recording layer 16 and the photoconductive layer 17. In the photoconductive recording layer 18, photoconductive regions (not shown) and charge accumulating regions (not shown) are dispersed in an electrically insulating region (not shown). Also, in the third embodiment, a plurality of charge accumulating regions correspond to one bit.

The recording medium 10 shown in FIG. 5 can be manufactured, for example, as follows.

In the first step, prepared is a glass disc having an optical figured main surface, and having a diameter of about 120 mm and a thickness of about 1.2 mm. Then, an Al film having a thickness of about 200 nm is formed as the conductive layer 12 by a vapor deposition method on the optical figured surface of the substrate 11. Further, an SiO$_2$ film having a thickness of about 200 nm is formed by a sputtering method as the insulating layer 13 on the conductive layer 12.

In the next step, the photoconductive recording layer 18 having a thickness of about 30 nm is formed on the insulating layer 13 by a spin coating method so as to obtain the recording medium 10 shown in FIG. 5. The photoconductive recording layer 18 is constructed such that electron donative organic dye molecules having a chemical formula (4) given below and photoconductive molecules having a chemical formula (5) given below are dispersed in an insulating polystyrene. In the photoconductive recording layer 18, the electrically insulating region is formed of the insulating polystyrene. Also, the charge accumulating regions are formed of the electron donative organic dye molecules having a chemical formula (4), and the photoconductive regions are formed of photoconductive molecules having a chemical formula (5).

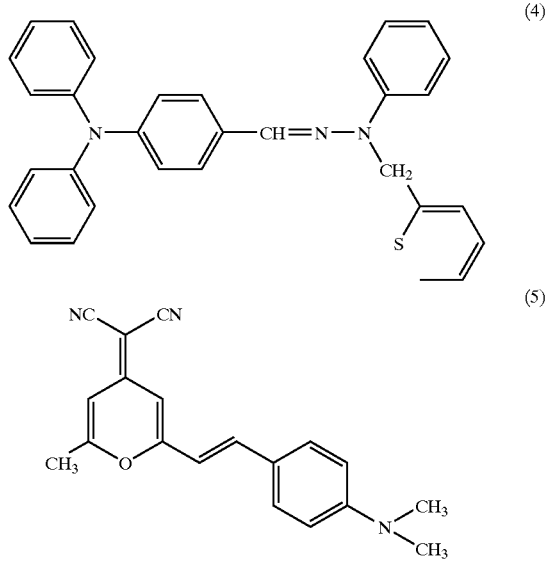

In the recording medium 10 in this embodiment, it is desirable for the photoconductive recording layer 18 to exhibit sufficient insulating properties during non-irradiation with light and to exhibit sufficient conductive properties during irradiation with light. In addition, it is desirable for the photoconductive recording layer 18 to be capable of accumulating a sufficiently large amount of electric charge in the charge accumulating regions and to exhibit a high resolution. Under the circumstances, it is desirable for the thickness of the photoconductive recording layer 18 to fall within a range of between about 10 nm and about 200 nm. Further, it is desirable for the charge accumulating region within the photoconductive recording layer 18 to be sufficiently smaller than the recording mark. Still further, it is desirable for the charge accumulating regions and the photoconductive regions to be uniformly dispersed in the electrically insulating region.

Information can be recorded on the recording medium 10 by using, for example, the apparatus shown in FIG. 2A. Specifically, the recording medium 10 is irradiated with a laser light having a wavelength of about 470 nm and emitted from a semiconductor laser 23 having an output of about 1 mW through the optical fiber 24 as a near field light, with the electrode 25 of the recording head 22 kept in contact with the photoconductive layer 17, while rotating the disc-like recording medium 10 at a speed of about 5,000 rpm by operating the motor 21. In this example, the diameter of the opening 27 of the optical fiber is about 80 nm. Also, the recording head 22 is moved in the radial direction so as to permit the recording medium 10 to be irradiated with the near field light in a spiral form.

If a pulse voltage of about 10V corresponding to the information to be recorded is applied in this step to the electrode 25, the conductivity is increased in that region of the photoconductive recording layer 18 which is irradiated with the near field light, though that region of the photoconductive recording layer 18 which is not irradiated with the near field light remains to be an insulator. As a result, a positive charge is selectively injected into only that region of the charge accumulating region which is irradiated with the near field light and to which voltage is applied. In this fashion, information is recorded on the recording medium 10.

The information thus recorded can be reproduced by the method similar to that employed in the first embodiment. Incidentally, the recording medium 10 having information recorded thereon by the method described above was left to stand at 80° C. for about one week, followed by reproducing the recorded information by using the mirco-FET sensor head 28. It has been found that the amount of charge accumulated in the charge accumulating region was decreased by about 10%, compared with the amount immediately after the information recording. However, about 30 dB of S/N ratio was obtained. In other words, it has been confirmed that the information recorded on the recording medium 10 can be retained with a high stability.

Also, the information recorded on the recording medium 10 can be erased, for example, as follows. Specifically, the recording medium 10 is irradiated with a laser light emitted from the semiconductor laser 23 through the optical fiber 24 as a near field light, with the electrode 25 of the recording head 22 kept in contact with the photoconductive recording layer 18 of the recording medium 10, while rotating the recording medium 10 at a speed of about 5,000 rpm by operating the motor 21. At the same time, a pulse voltage of about -4V is applied to the electrode 25. Incidentally, the recording head 22 is moved in the radial direction so as to permit the recording medium 10 to be irradiated with the near field light in a spiral form. By the particular operation, the positive charge accumulated in the charge accumulating region is discharged to the outside through the photoconductive regions of the photoconductive recording layer 18 and the electrode 25 by the principle equal to that described previously in conjunction with the information recording. In this fashion, the information recorded on the recording medium 10 can be erased. The recorded information was actually erased by the particular method, followed by reproducing the information by using the mirco-FET sensor head 28. It has been found that the information was completely erased.

Also, an over-write recording can also be performed on the recording medium 10 shown in FIG. 5. For example, a pulse voltage of 10V corresponding to the information that is to be newly recorded is superposed with a pulse voltage of -4V for erasing the information recorded in advance, and the resultant pulse voltage is applied to the electrode 25. As a result, the erasure of the information recorded in advance and the recording of the new information can be performed simultaneously.

A fourth embodiment of the present invention will now be described.

Figure 6:
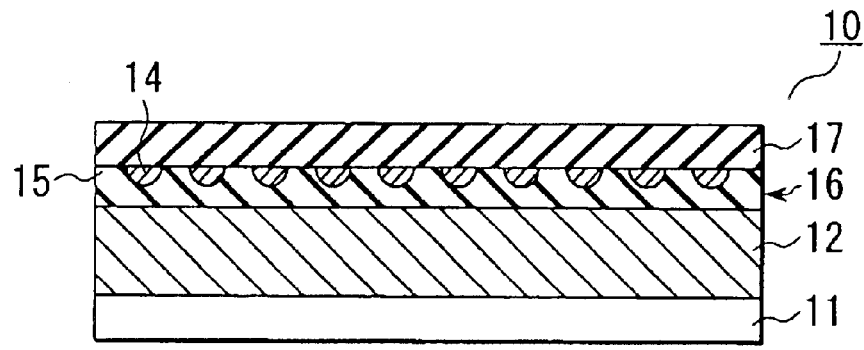
FIG. 6 is a cross sectional view schematically showing a recording medium according to a fourth embodiment of the present invention.

Specifically, FIG. 6 is a cross sectional view schematically showing the construction of a recording medium 10 according to the fourth embodiment of the present invention. The recording medium 10 shown in FIG. 6 has a structure that a conductive layer 12, a recording layer 16, and a photoconductive layer 17 are stacked on a substrate 11 in the order mentioned. The fourth embodiment differs from the first embodiment in that the insulating layer 13 is not formed in the fourth embodiment. Also, the recording layer 16 is constituted by an electrically insulating region (insulating layer) 15 having a plurality of pits formed on the surface and a plurality of electrically insulating regions 14 filling these pits. Also, in this embodiment, each of the plural charge accumulating regions 14 corresponds to one bit.

The recording medium 10 shown in FIG. 6 can be manufactured, for example, as follows.

In the first step, a glass disc having an optical figured main surface and having a diameter of about 120 nm and a thickness of about 1.2 mm, is prepared as the substrate 11. Then, an Al film having a thickness of about 500 nm is formed as the conductive layer 12 by vapor deposition on the optical figured surface of the substrate 11.

In the next step, a stamper having projections arranged at an interval of about 13 nm is pressed against the conductive layer 12 so as to form scars on the surface of the conductive layer 12. The projection of the stamper is made of SiC and has a tip diameter of about 3 nm. Then, the conductive layer 12 having the scarred surface is subjected to an anodic oxidation in a dilute sulfuric acid. As a result, oxidation of the surface of the conductive layer 12 and the chemical etching are carried out simultaneously so as to form an electrically insulating region 15 made of $Al_2O_3$ and having a plurality of pits on the surface. To be more specific, by the oxidation of the surface of the conductive layer 12, the electrically insulating region 15 is formed in a thickness of 80 nm and, at the same time, pits each having a diameter of about 10 nm and a depth of about 20 nm and arranged such that the distance between the centers of the adjacent pits is about 13 nm are formed by the chemical etching at the scars on the surface of the conductive layer 12.

Then, a molten Se is poured into the pits under vacuum, followed by rotating the substrate at about 200 rpm while heating the substrate, thereby centrifugally removing the excess Se attached to the upper surface of the electrically insulating region 15. In other words, Se is allowed to remain only within the pits so as to form the charge accumulating regions 14.

Further, a photoconductive layer 17 made of CdSe is formed in a thickness of about 10 nm by a sputtering method on the recording layer 16 having the electrically insulating region 15 and the charge accumulating regions 14, thereby obtaining the recording medium 10 shown in FIG. 6.

Information can be recorded on the recording medium 10 by using, for example, the apparatus shown in FIG. 2A. Specifically, the recording medium 10 is irradiated with a laser light having a wavelength of about 670 nm and emitted from a semiconductor laser 23 having an output of about 1 mW through the optical fiber 24 as a near field light, with the electrode 25 of the recording head 22 kept in contact with the photoconductive layer 17, while rotating the disc-like recording medium 10 at a speed of about 3,000 rpm by operating the motor 21. In this example, the diameter of the opening 27 of the optical fiber is about 10 nm. Also, the recording head 22 is moved in the radial direction so as to permit the recording medium 10 to be irradiated with the near field light in a spiral form.

If a pulse voltage of about −10V corresponding to the information to be recorded is applied in this step to the electrode 25, the conductivity is increased in that region of the photoconductive layer 17 which is irradiated with the near field light, though that region of the photoconductive layer 17 which is not irradiated with the near field light remains to be an insulator. As a result, a negative charge is selectively injected into only that region of the charge accumulating region which is irradiated with the near field light and to which voltage is applied. In this fashion, information is recorded on the recording medium 10.

The information thus recorded can be reproduced by the method similar to that employed in the first embodiment. Incidentally, the recording medium 10 having information recorded thereon by the method described above was left to stand at 80° C. for about one week, followed by reproducing the recorded information by using the mirco-FET sensor head 28. It has been found that the amount of charge accumulated in the charge accumulating region was decreased by about 5%, compared with the amount immediately after the information recording. However, about 30 dB of S/N ratio was obtained. In other words, it has been confirmed that the information recorded on the recording medium 10 can be retained with a high stability.

Also, the information recorded on the recording medium 10 can be erased, for example, as follows. Specifically, the recording medium 10 is irradiated with a laser light emitted from the semiconductor laser 23 through the optical fiber 24 as a near field light, with the electrode 25 of the recording head 22 kept in contact with the photoconductive recording layer 18 of the recording medium 10, while rotating the recording medium 10 at a speed of about 3,000 rpm by operating the motor 21. At the same time, a pulse voltage of about 5V is applied to the electrode 25. Incidentally, the recording head 22 is moved in the radial direction so as to permit the recording medium 10 to be irradiated with the near field light in a spiral form. By the particular operation, the negative charge accumulated in the charge accumulating region is discharged to the outside through the photoconductive regions 17 and the electrode 25 by the principle equal to that described previously in conjunction with the information recording. In this fashion, the information recorded on the recording medium 10 can be erased. The recorded information was actually erased by the particular method, followed by reproducing the information by using the mirco-FET sensor head 28. It has been found that the information was completely erased.

Also, an over-write recording can also be performed on the recording medium 10 shown in FIG. 6. For example, a pulse voltage of −10V corresponding to the information that is to be newly recorded is superposed with a pulse voltage of 5V for erasing the information recorded in advance, and the resultant pulse voltage is applied to the electrode 25. As a result, the erasure of the information recorded in advance and the recording of the new information can be performed simultaneously.

According to the fourth embodiment, it is possible to obtain effects similar to those obtained in the first embodiment. In the fourth embodiment, the charge accumulating regions 14 are formed in predetermined positions as in the first embodiment, and each of the charge accumulating regions 14 corresponds to one bit. It follows that it is possible to cope with the wobbling of the recording medium 10 by correcting the positions of the recording head 22 and the reproducing head 28 based on the positions of the charge accumulating regions 14. Further, since the electrically insulating region 15 is formed by utilization oxidation in the fourth embodiment, the electrically insulating region 15 can be formed of a metal oxide having a low conductivity. Therefore, the fourth embodiment of the present invention makes it possible to obtain a high S/N ratio and, thus, the size of the charge accumulating regions 14 can be diminished. In other words, a high recording density can be obtained. In addition, in the fourth embodiment, the recording layer 16 can be formed by using a stamper without using an electron beam depiction, making it possible to achieve a high productivity.

A fifth embodiment of the present invention will now be described.

Figure 7:
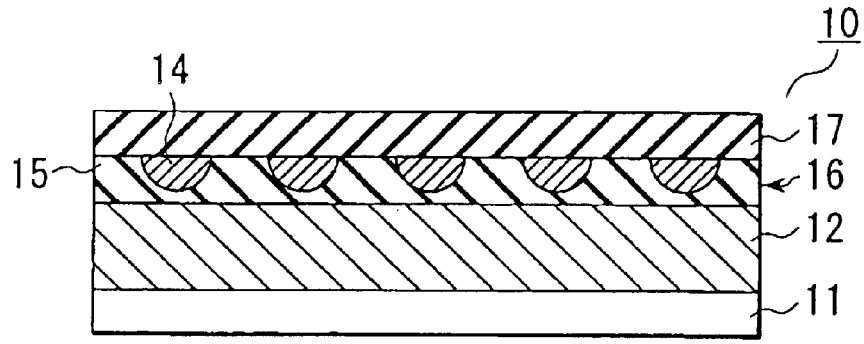
FIG. 7 is a cross sectional view schematically showing a recording medium according to a fifth embodiment of the present invention.

Specifically, FIG. 7 is a cross sectional view schematically showing the construction of a recording medium 10 according to the fifth embodiment of the present invention. The recording medium 10 shown in FIG. 7 has a structure that a conductive layer 12, a recording layer 16, and a photoconductive layer 17 are stacked on a substrate 11 in the order mentioned, like the recording medium 10 shown in FIG. 6. It should be noted, however, that the recording medium 10 shown in FIG. 7 differs from that shown in FIG. 6 in that the photoconductive layer 17 included in the recording medium 10 shown in FIG. 7 contains a material whose conductivity is non-linearly changed in accordance with the intensity of light. Each of the charge accumulating regions 14 corresponds to one bit in the fifth embodiment shown in FIG. 7, too.

The recording medium 10 shown in FIG. 7 can be manufactured, for example, as follows.

In the first step, a glass disc having an optical figured main surface, and having a diameter of about 120 nm and a thickness of about 1.2 mm, is prepared as the substrate 11. Then, an Al film having a thickness of about 500 nm is formed as the conductive layer 12 by vapor deposition on the optical figured surface of the substrate 11.

In the next step, a stamper having projections arranged at an interval of about 100 nm is pressed against the conductive layer 12 so as to form scars on the surface of the conductive layer 12. The projection of the stamper is made of SiC and has a tip diameter of about 3 nm. Then, the conductive layer 12 having the scarred surface is subjected to an anodic oxidation in a dilute sulfuric acid. As a result, oxidation of the surface of the conductive layer 12 and the chemical etching are carried out simultaneously so as to form an electrically insulating region 15 made of $Al_2O_3$ and having a plurality of pits on the surface. To be more specific, by the oxidation of the surface of the conductive layer 12, the electrically insulating region 15 is formed in a thickness of 100 nm and, at the same time, pits each having a diameter of about 80 nm and a depth of about 80 nm and arranged such that the distance between the centers of the adjacent pits is about 100 nm are formed by the chemical etching at the scratches on the surface of the conductive layer 12.

Then, a molten Se is poured into the pits under vacuum, followed by rotating the substrate at about 200 rpm while heating the substrate, thereby centrifugally removing the excess Se attached to the upper surface of the electrically insulating region 15. In other words, Se is allowed to remain only within the pits so as to form the charge accumulating regions 14.

Further, a photoconductive layer 17 having a thickness of about 30 nm is formed by a spin coating of a chloroform solution of polycarbonate having β-phthalocyanine dispersed therein on the recording layer 16 having the electrically insulating region 15 and the charge accumulating regions 14, thereby obtaining the recording medium 10 shown in FIG. 7.

Figure 8:
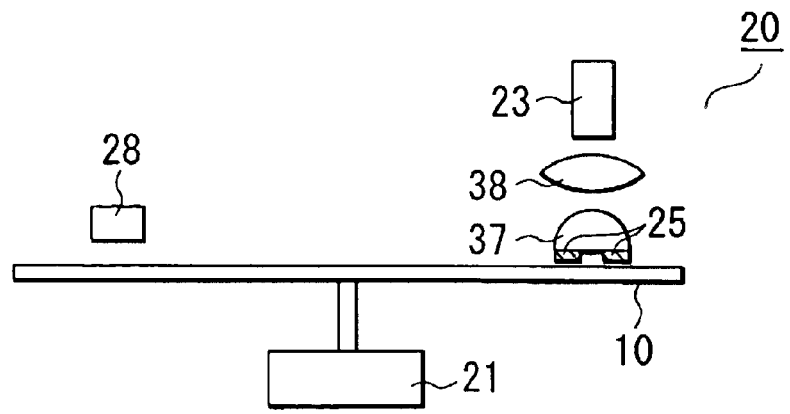
FIG. 8 is a view schematically showing a recording-reproducing apparatus according to the fifth embodiment of the present invention.

Information can be recorded on the recording medium 10 and the recorded information can be reproduced and erased by using the apparatus shown in, for example, FIG. 8.

Specifically, FIG. 8 schematically shows a recording-reproducing apparatus 20 according to a fifth embodiment of the present invention. The recording-reproducing apparatus 20 shown in FIG. 8 has a motor 21 for rotating the recording medium 10, a semiconductor laser 23, a recording head 22, lenses 37 and 38 interposed between the recording head 22 and the semiconductor layer 23, an electrode 25 mounted to the lens 37 in a manner to face the recording medium 10, and a reproducing head 28. In the recording-reproducing apparatus 20 shown in FIG. 8, the recording medium 10 is arranged such that the photoconductive layer 17 faces the lens 37. Also, in the recording-reproducing apparatus 20 shown in FIG. 8, the lens 37, the electrode 25, etc. collectively constitute the recording head 22. Incidentally, the recording medium 10 may or may not be a constituent of the recording-reproducing apparatus 20. In other words, the recording medium 10 may be non-removable or may be removable.

Information can be recorded on the recording medium 10 shown in FIG. 7 by using the apparatus shown in FIG. 8, for example, as follows. Specifically, the recording medium 10 is irradiated with a laser light having a wavelength of about 620 nm, which is emitted from the semiconductor laser 23 having an output of about 1 mW through the lenses 37 and 38, with the electrode 25 of the recording head 22 kept in contact with the photoconductive layer 17, while rotating the disc-like recording medium 10 at about 3,000 rpm by operating the motor 21. In this embodiment, the beam diameter of the laser light on the surface of the recording medium 10 is controlled to be about 600 nm by the lenses 37 and 38. Also, the recording head 22 is moved in the radial direction to permit the recording medium 10 to be irradiated with the laser light in a spiral pattern. In this step, information can be recorded on the recording medium 10 by applying a pulse voltage of about −20V corresponding to the information to be recorded to the electrode 25.

As described above, the photoconductive layer 17 in this embodiment contains a material whose conductivity is non-linearly changed in accordance with the intensity of the light. Also, the laser light has an intensity distribution such that the intensity is decreased from the center toward the periphery like the Gaussian distribution. Therefore, in this embodiment, the conductivity of the photoconductive layer is greatly changed in only the central region of the portion irradiated with the laser light, and the conductivity is scarcely changed in the other regions, which differs from any of the first to fourth embodiments described above. It follows that, in this embodiment, the charge can be selectively injected into a desired charge accumulating regions regardless of the fact that the beam diameter (about 600 nm) of the laser light is markedly larger than the charge accumulating region (about 80 nm). As a matter of fact, it has been confirmed by the reproducing method similar to that described previously in conjunction with the first embodiment that one bit information was recorded in each of the charge accumulating regions 14.

The recording medium 10 having the information recorded thereon as described above was left to stand at about 80° C. for about one week, followed by reproducing the recorded information by using the mirco-FET sensor head 28. The amount of charge accumulated in the charge accumulating region was found to have been decreased by about 5%, compared with the amount of charge immediately after the information recording. However, it was possible to obtain an S/N ratio of about 30 dB. In other words, it has been confirmed that the recorded information can be stably retained on the recording medium 10.

The information recorded on the recording medium 10 can be erased, for example, as follows. Specifically, the recording medium 10 is irradiated with a laser light emitted from the semiconductor laser 23 through the lenses 37 and 38, with the electrode 25 of the magnetic head 22 kept in contact with the photoconductive layer 17, while rotating the recording medium 10 at about 3,000 rpm by operating the motor 21. At the same time, a pulse voltage of about 10V is applied to the electrode 25. Incidentally, the beam diameter of the laser light on the surface of the recording medium 10 is controlled at about 600 nm by the lenses 37 and 38. Also, the recording head 22 is moved in the radial direction to permit the recording medium 10 to be irradiated with the laser light in a spiral pattern. By the particular operation, the negative charge accumulated in the charge accumulating regions 14 is discharged to the outside through the photoconductive region 17, the electrode 25, etc. by the principle similar to that described previously in conjunction with the information recording. In this fashion, the information recorded on the recording medium 10 can be erased. The recorded information was actually erased by this method, followed by reproducing the information by using the mirco-FET sensor head 28. It has been confirmed that the information was completely erased.

An over-write recording can also be performed on the recording medium 10 shown in FIG. 7. For example, a pulse voltage of −20V corresponding to the information that is to be newly recorded is superposed with a pulse voltage of 10V for erasing the information already recorded on the recording medium, and the resultant pulse voltage is applied to the electrode 25. As a result, the erasure of the information that is already recorded and the recording of the new information can be performed simultaneously.

As described above, the fifth embodiment permits obtaining the effects similar to those described previously in conjunction with the first to fourth embodiments. Also, in the fifth embodiment, the photoconductive layer 17 contains a material whose conductivity is changed non-linearly in accordance with the intensity of light. As a result, the size of that region of the photoconductive layer 17 in which the conductivity is increased by light irradiation is smaller than the beam diameter of the light. It follows that, in this embodiment, it is possible to achieve a so-called "ultra resolution" recording.

A sixth embodiment of the present invention will now be described.

Figure 9:
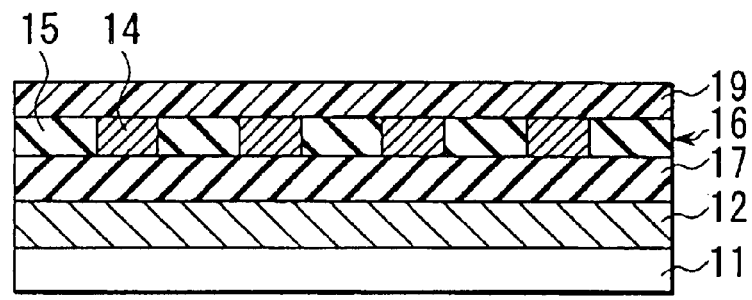
FIG. 9 is a cross sectional view schematically showing a recording medium according to a sixth embodiment of the present invention.

FIG. 9 is a cross sectional view schematically showing the construction of a recording medium 10 according to the sixth embodiment of the present invention. As shown in the drawing, the recording medium 10 of the sixth embodiment has a structure that a conductive layer 12, a photoconductive layer 17, a recording layer 16, and a protective layer 19 are stacked on a substrate 11 in the order mentioned. The sixth embodiment differs from any of the first to fifth embodiments in that, in the sixth embodiment, the photoconductive layer 17 is interposed between the conductive layer 12 and the recording layer 16. In the recording medium 10 of the sixth embodiment, the recording layer 16 has a structure that charge accumulating regions 14 and electrically insulating regions 15 are juxtaposed on the photoconductive layer 17. As shown in the drawing, the adjacent charge accumulating regions 14 are electrically insulated from other by the intervening electrically insulating region 15. In this embodiment, each of the charge accumulating regions 14 corresponds to one bit.

The recording medium 10 shown in FIG. 9 can be manufactured, for example, as follows.

In the first step, prepared as the substrate 11 is a glass disc having an optical figured main surface and having a diameter of about 120 mm and a thickness of about 1.2 mm. Then, an Al film having a thickness of about 200 nm is formed by vapor deposition on the optical figured surface of the substrate 11 so as to form the conductive layer 12. Further, the photoconductive layer 17 made of the compound having the chemical structure (2) referred to previously and having a thickness of about 30 nm is formed by a spin coating method on the conductive layer 12.

In the next step, a resist film having a thickness of about 20 nm is formed on the photoconductive layer 17 by spin coating of polydiisobutyl fumarate, which is an electron resist, followed by irradiating the resist film with an electron beam in a predetermined pattern by using an EB depicting apparatus. Then, the resist film after the electron beam depiction is developed with ethanol, thereby obtaining a thin film having a plurality of through-holes as the electrically insulating region 15. In this example, the electrically insulating region 15 was formed such that each of the through-holes has a circular opening having a diameter of about 80 nm and that the distance between the centers of the adjacent through-holes is about 120 nm.

Then, electron donative organic dye molecules having the chemical structure (1) referred to previously are evaporate onto the entire surface of the substrate 11 having the electrically insulating region 15 formed thereon, followed by heating the substrate having the organic dye molecules deposited thereon at about 80° C. for about one hour under a nitrogen gas atmosphere. The electron donative organic dye molecules deposited by vapor deposition on the upper surface of the electrically insulating region 15 are caused to flow into the through-holes by this heating so as to form the charge accumulating regions 14 within the through-holes. As a result, obtained is the recording layer 16 having the charge accumulating regions 14 and the electrically insulating regions 15.

Finally, a protective layer 19 having a thickness of about 10 nm and made of polyimide is formed on the recording layer 16, thereby obtaining the recording medium 10 shown in FIG. 9.

In this embodiment, the electrically insulating regions 15 and the protective layer 19 are not absolutely necessary. However, in the case of forming these layers 15 and 19, the electric charge injected into the charge accumulating regions 14 can be retained with a high stability. Also, the material of the protective layer 19 is not particularly limited as far as the protective layer 19 is formed of an insulating material.

Figure 10A:
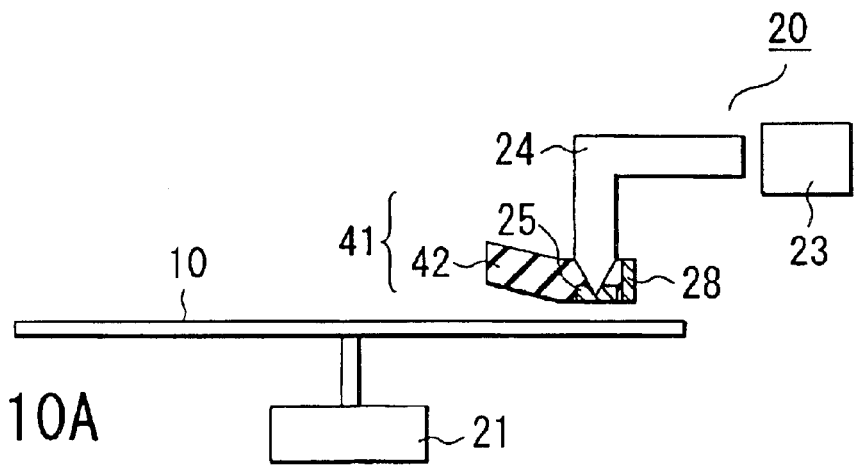
FIG. 10A is a view schematically showing a recording-reproducing apparatus according to the sixth embodiment of the present invention.
Figure 10B:
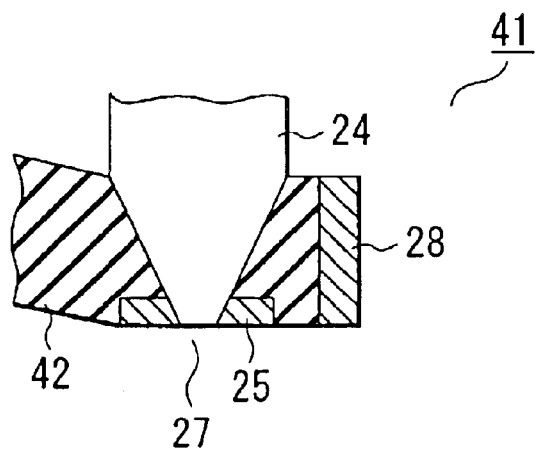
FIG. 10B is a magnified view showing a part of the recording-reproducing apparatus shown in FIG. 10A.

Recording of information on the recording medium 10 and reading and erasing of the information recorded on the recording medium 10 can be performed by using, for example, the apparatus shown in FIGS. 10A and 10B. Specifically, FIG. 10A schematically shows the recording-reproducing apparatus 20 according to the sixth embodiment of the present invention. On the other hand, FIG. 10B shows in a magnified fashion a part of the recording-reproducing apparatus shown in FIG. 10A.

The recording-reproducing apparatus 20 shown in FIG. 10A has a motor 21 for rotating the recording medium 10, a flying head 41 arranged to face the recording medium 10 and used as a recording-reproducing head, an optical fiber 24 having one end connected to the flying head 41, and a semiconductor laser 23 connected to the other end of the optical fiber 24. Incidentally, in the recording-reproducing apparatus 20, the recording medium 10 is arranged such that the protective layer 19 of the recording medium 10 faces the flying head 22. Also, the recording medium 10 may or may not be a constituent of the recording-reproducing apparatus 20. In other words, the recording medium 10 may either non-removable or removable.

As shown in FIG. 10B, the flying head 41 has a slider 42. The optical fiber 24 extends through the slider 42. The slider 42 serves to float the flying head 41 by utilizing the gas stream generated by the rotation of the recording medium 10. The optical fiber 24 is tapered within the slider 42 toward the recording medium 10, and forms an opening 27 at the edge on the side of the recording medium 10. Also, an electrode 25 is arranged within the slider 42 on the side of the recording medium 10 in a manner to surround the opening 27. Further, a mirco-FET sensor 2B equal in construction to that shown in FIG. 3 is mounted to one end of the slider 42. The flying head 42 is used for the recording of information on the recording medium 10 as well as for the reproduction and erasure of the information recorded on the recording medium 10.

Information can be recorded on the recording medium 10 shown in FIG. 9 by using, for example, the recording-reproducing apparatus 20 shown in FIG. 10A. To be more specific, the recording medium 10 is irradiated with a laser light, as a near field light, having a wavelength of about 620 nm, which is emitted from the semiconductor laser 23 having an output of about 1 mW through the optical fiber 24, while rotating the disc-like recording medium 10 at about 4,000 rpm by operating the motor 21. In this case, the opening 27 of the optical fiber 24 has a diameter of about 80 nm. Also, the recording head 22 is moved in the radial direction to permit the recording medium 10 to be irradiated with the laser light in a spiral pattern.

It should be noted that, if a pulse voltage of about 10V corresponding to the information to be recorded is applied to the electrode 25, the conductivity is increased in that portion of the photoconductive layer 17 which is irradiated with the near field light, though the non-irradiated portion of the photoconductive layer 17 remains to be an insulator. As described previously, the slider 42 floats the flying head 41 by utilizing the gas stream generated by the rotation of the recording medium 10. Therefore, the sixth embodiment differs from any of the first to fifth embodiments in that, in the sixth embodiment, the electrode 25 is positioned a predetermined distance apart from the recording medium 10. Therefore, in the sixth embodiment, positive charges are injected from the conductive layer 12, not from the electrode 25, into the charge accumulating regions 14 irradiated with the near field light and having voltage applied thereto, thereby performing the information recording on the recording medium 10.

The information thus recorded can be reproduced by using the mirco-FET sensor head 28. Specifically, the information recorded on the recording medium 10 can be read out by floating the flying head 41 by the method described previously and by observing the change in the current flowing between the source 32 and the drain 33 of the mirco-FET sensor head 28.

The recording medium 10 having the information recorded thereon by the method described above was left to stand at about 80° C. for about one week, followed by reproducing the recorded information by using the mirco-FET sensor head. It has been found that the amount of charge accumulated in the charge accumulating regions 14 was decreased by about 3%, compared with the amount immediately after the information recording. However, it was possible to obtain about 30 dB of S/N ratio. In other words, it has been confirmed that the recording medium 10 is capable of stably retaining the recorded information.

Also, the information recorded on the recording medium 10 can be erased, for example, as follows. Specifically, the recording medium 10 is irradiated with a laser light emitted from the semiconductor laser 23 as a near field light through the optical fiber 24 while rotating the recording medium 10 at about 4,000 rpm by operating the motor 21, and at the same time, a pulse voltage of about −3V is applied to the electrode 25. Incidentally, the flying head 41 is moved in the radial direction to permit the recording medium 10 to be irradiated with the near field light in a spiral pattern. By the particular operation, the positive charge is discharged from the charge accumulating regions 14 through the photoconductive layer 17 into conductive layer 12. In this fashion, the information recorded on the recording medium 10 is erased. The recorded information was actually erased by the method described above, followed by reproducing the information by using the mirco-FET sensor head. It has been confirmed that the information was completely erased.

An over-write recording can also be performed on the recording medium 10. For example, the erasure of the recorded information and the recording of new information can be performed simultaneously by, for example, superposing a pulse voltage of 10V corresponding to the new information to be recorded with a pulse voltage of −3V for erasing the recorded information and by applying the resultant pulse voltage to the electrode 25.

As described above, according to the sixth embodiment, it is possible to obtain the effects similar to those described previously in conjunction with the fist embodiment. Also, in the sixth embodiment, the electrode 25 need not be brought into contact with the recording medium 10 because charges are injected from the conductive layer 12 into the charge accumulating regions 14 through the photoconductive layer 17. It follows that, according to the sixth embodiment, the possibility of abrasion of the surface of the recording medium 10 and the possibility for the head to be fixed to the recording medium 10 so as to be made immovable are lowered. Further, in this embodiment, the surface of the recording medium 10 need not be smooth because the electrode 25 need not be brought into contact with the recording medium 10. It follows that the protective layer 19 need not be formed thick and, thus, charges can be injected into the charge accumulating regions 14 with a relatively low voltage.

In each of the first to sixth embodiments described above, the mirco-FET sensor head 28 is used for reading the information recorded in the recording medium 10. However, it is also possible to employ another method. For example, it is possible to employ the method of measuring the electrostatic force by using an atomic force microscope (AMF), the method of measuring the change in the electric capacitance, and the method of measuring the change in the intensity or in the wavelength of any of the absorbed light, the reflected light and fluorescence generated by irradiating the recording medium 10 with light having an intensity and wavelength that do not break the recording.

The material, whose conductivity is increased by light absorption, contained in the photoconductive layer 17 and the photoconductive recording layer 18, is not limited to the materials exemplified in the first to sixth embodiments. Such a material may be either organic or inorganic. Preferably, the material should exhibit high insulating properties during non-irradiation with light, and the conductivity should be drastically improved upon irradiation with light. Also, the response speed of the material to light should desirably be high. Preferably, the response speed should not less than the value between about 100 MHz and about 1 GHz.

Among the materials whose conductivity is increased by light absorption, the organic materials include, for example, compounds (A1) to (A6) given below:

(A1) fused polycyclic pigment

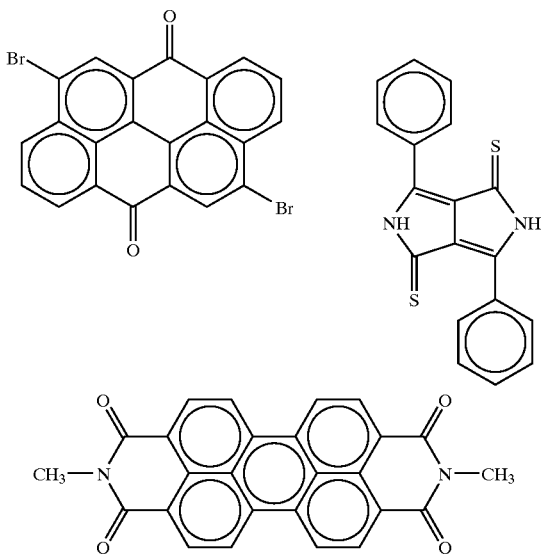

(A2) bis- and tris-azo type pigment
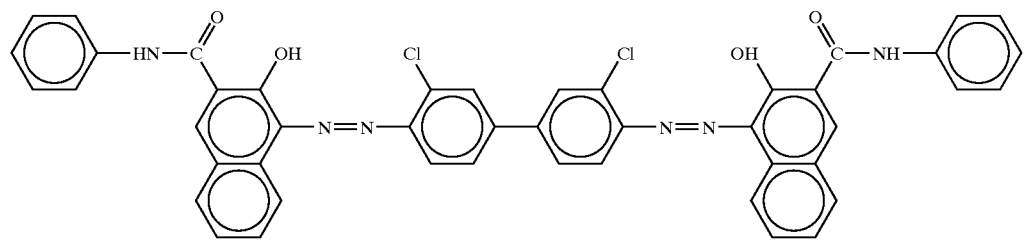
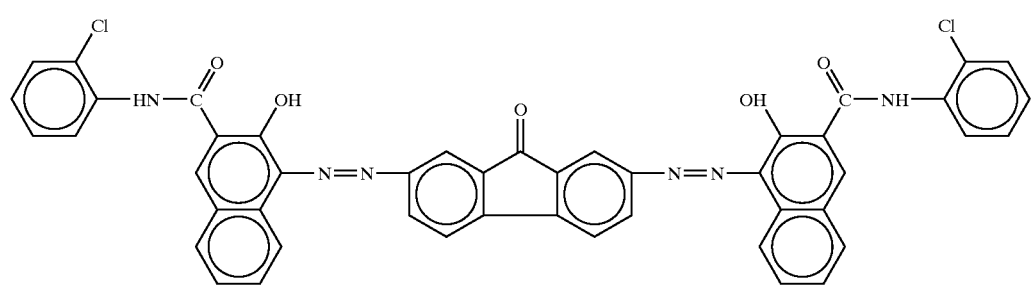
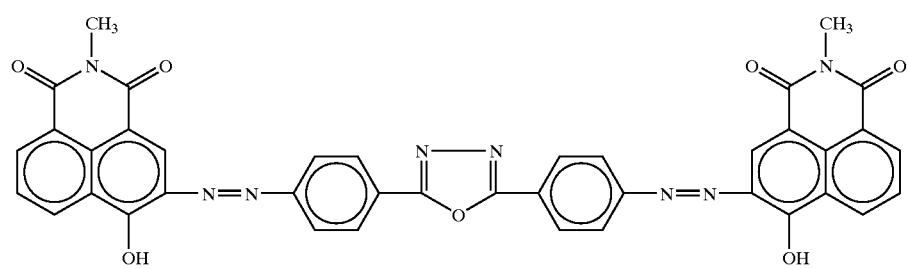
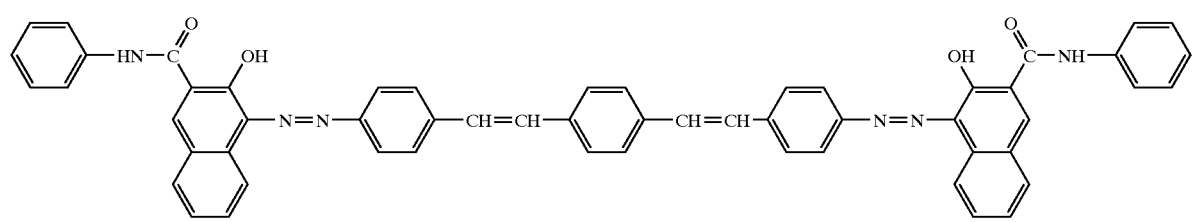
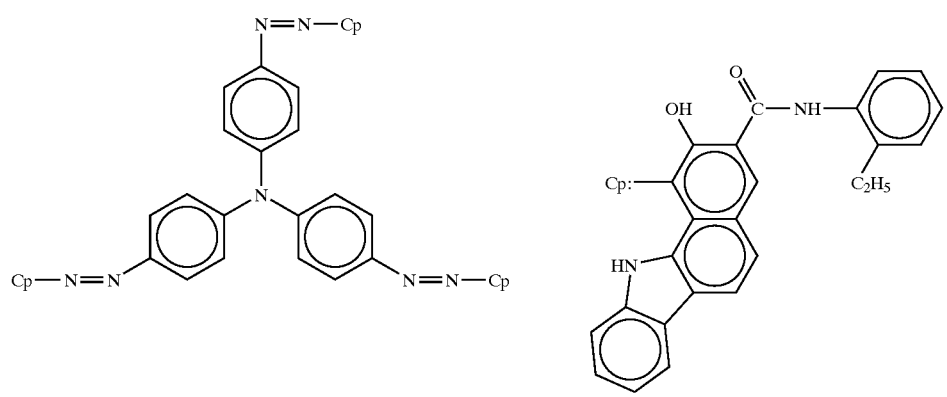

(A3) phthalocyanine pigment
x—H₂PC, τ—H₂Pc, ε—CuPc, VOPc, TiOPc, AlClPc, ClGaPc, HOGaPc (A4) squarilium dye

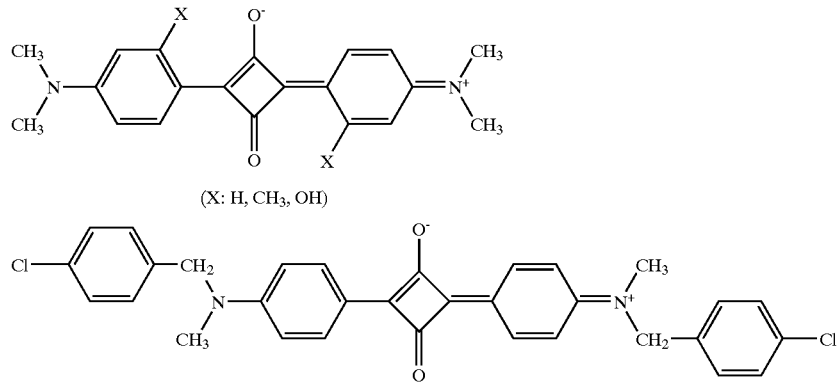

(X: H, CH₃, OH)

(A5) cyanine dye

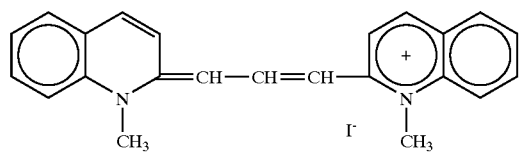

(A6) azulenium salt dye

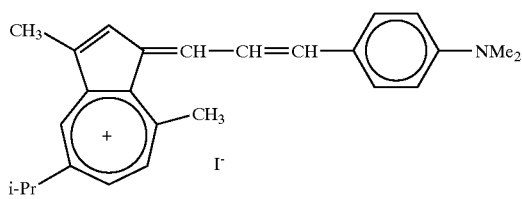

Among the materials whose conductivity is increased by light absorption, the inorganic materials include, for example, metal or a nonmetal such as Si, Se or Ge; an oxide such as ZnO, TiO₂, or SnO₂; and an alloy or a compound such as AlGaAs, GaAs, AlInAs, GaInAs, GaInP₂, InP, PbS, ZnS, ZnSSe, ZnTe, As₂SeTe₂, As₂Te₃, CdS, CdTe, ZnCdTe, CdSSe, CdSe, CuInSe₂ and CuS.

These materials whose conductivity is increased by light absorption can be used singly or in the form of a mixture of at least two of these materials. Further, these materials can be dispersed in various matrixes.

The charge accumulating materials, which are contained in the recording layer 16 or the photoconductive recording layer 18, are not limited to those exemplified in the first to sixth embodiments. Where the charge to be accumulated is an electron, it is necessary for the energy level of the conduction band and the LUMO of the recording layer 16 and the charge accumulating region 14 to be lower than the energy level of the conduction band and the LUMO of the photoconductive layer 17. On the other hand, where the charge to be accumulated is a hole, the energy level of the valence band and the HOMO of the recording layer 16 and the charge accumulating region 14 to be higher than the energy level of the valence band and the HOMO of the photoconductive layer 17.

The charge accumulating material may be either organic or inorganic. Among the charge accumulating materials, the organic materials include, for example, electron donative materials having the molecular skeletons (B1) to (B7) and electron acceptive materials having the molecular skeletons (C1) to (C5) given below:

(B1) fulvalene type donor

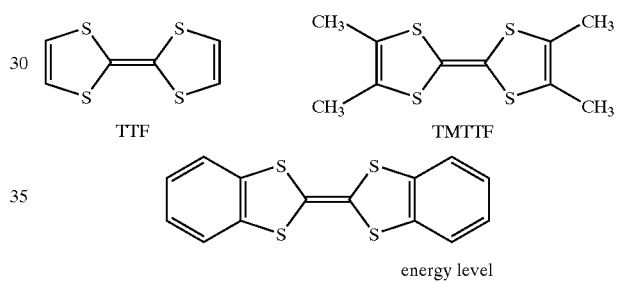

energy level

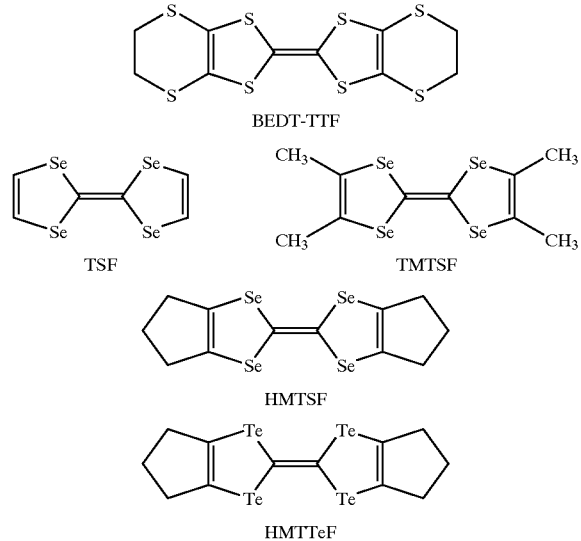

B2) sulfur-containing hetero donor tetrathio tetracene (TTT)

tetraseleno tetracene (TST)

tetrathio naphthalene tetrathio perylene tetraphenyl bithio pyranidene (BTP)

bibenzo thiopene (BBT)

[φ denotes a phenyl group]

(B3) amine type donor aniline

N-methyl aniline p-phenylene diamine

TMPD diamino naphthalene benzidine tetramethyl benzidine diamino pyrene

[R represents a hydrogen atom or an alkyl group]

(B4) metal complex type donor
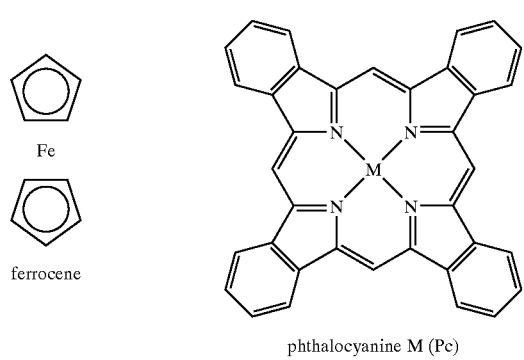
ferrocene
phthalocyanine M (Pc)
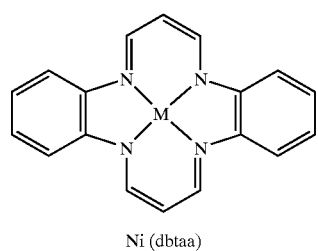
Ni (dbtaa)
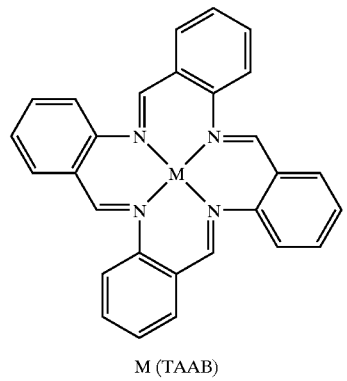
M (TAAB)
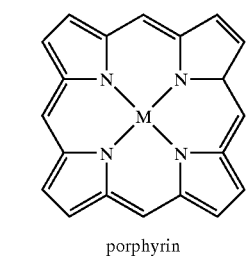
porphyrin
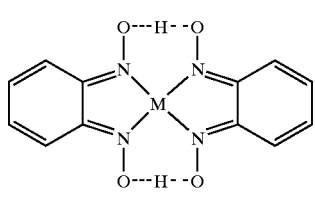
M(bqd)$_2$
[M represents a metal atom]
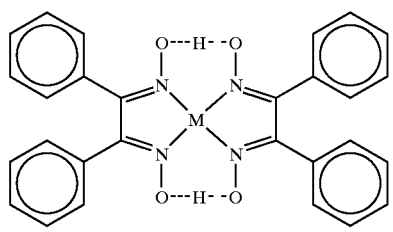
M(bpq)$_2$
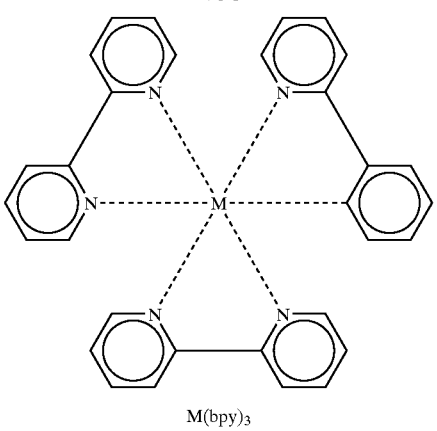
M(bpy)$_3$
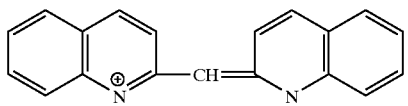
[M represents a metal atom]
(B5) cyanine coloring matter donor
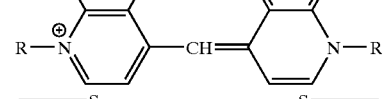
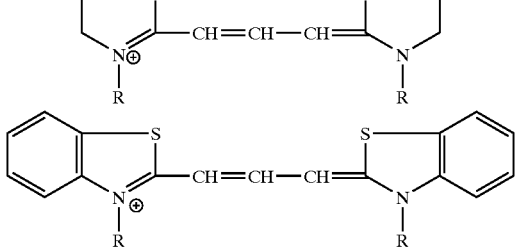

-continued

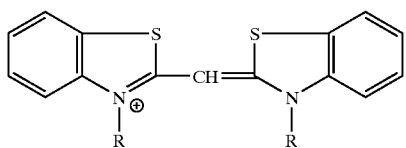

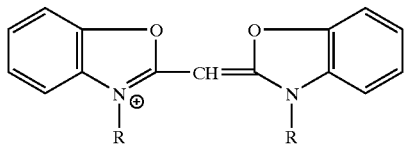

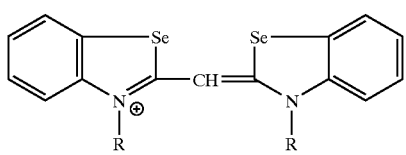

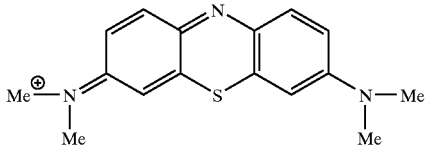

[Me represents a methyl group, and R represents a hydrogen atom or an alkyl group]

(B6) nitrogen-containing hetero cyclic donor

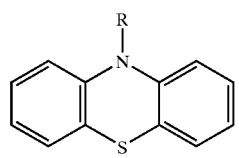
phenothiazine

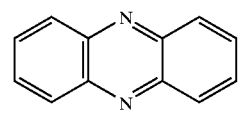
phenazine

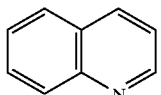
quinoline

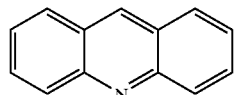
acridine

B7) polymer type donor

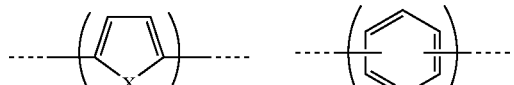
polyacethylene

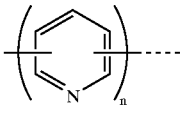

polypyrrol [X = N]
polythiophene [X = S]
polyfuran [X = O]

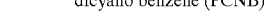
polypyridine

poly-p-phenylene

-continued

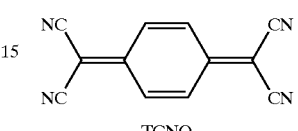
poly-p-phenylene sulfide (C1) cyano compound type acceptor

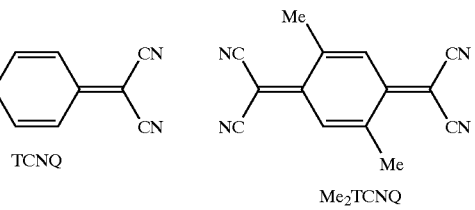
TCNQ      Me₂TCNQ

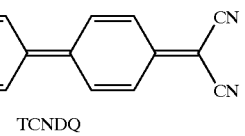
TCNDQ

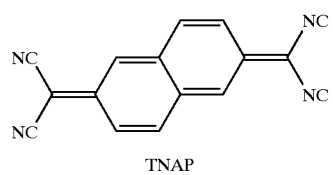
TNAP

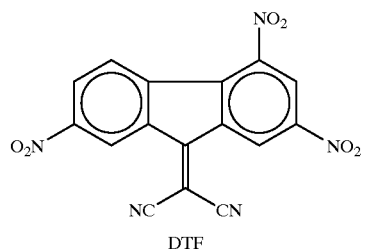
DTF

dicyano benzene (PCNB)

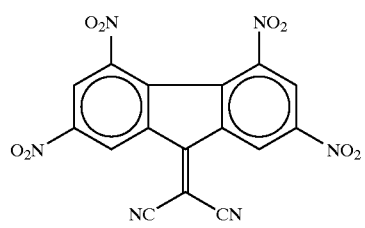

(C2) quinone type acceptor

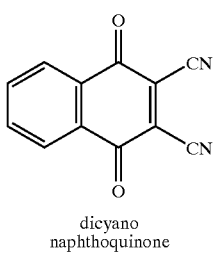

dicyano naphthoquinone

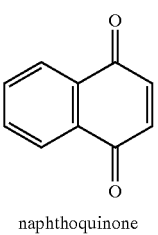

naphthoquinone

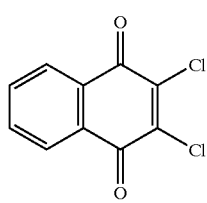

2, 3-dicyclo naphthoquinone

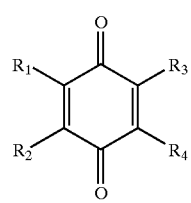

(Each of $R_1$ to $R_4$ denotes a hydrogen atom, a halogen atom, an alkyl group, an alkenyl group, an aryl group, an alkoxy group, an alkylthio group, an alkoxy carbonyl group, a cyano group, an amino group, a carboxyl group, an acetyl group or formyl group.)

(C3) nitro compound type acceptor

p-nitro cyano benzene

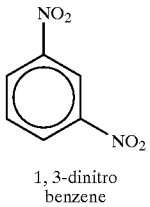

1, 3-dinitro benzene

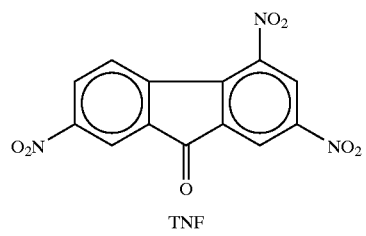

TNF

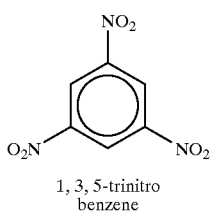

1, 3, 5-trinitro benzene

p-dinitro benzene (C4) quinodiimine type acceptor

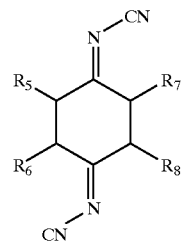

(Each of $R_5$ to $R_8$ denotes a hydrogen atom, a halogen atom, an alkyl group, an alkenyl group, an aryl group, an alkoxy group, an alkylthio group, an alkoxy carbonyl group, a cyano group, a nitro group, a hydroxyl group, an amino group, a carboxyl group, an acetyl group or formyl group.)

(C5) viologen type acceptor

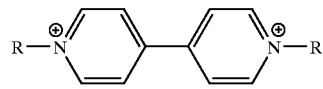

(R represents an alkyl group or an aryl group.)

As the molecules having the skeletons (B1) to (B7) and (C1) to (C5), it is desirable to use polymers having such a skeleton or a material having a low molecular weight, which is given by the general formula given below. Usually, since the thin film formed by these materials is amorphous, it is possible to obtain easily a thin film uniform in thickness and composition by using these materials.

$$Z-(X-Y)_n$$

where Z represents an aromatic skeleton or an aliphatic skeleton, Y represents an electron donative or acceptive skeleton, X represents a bonding group such as a signal bond, an ethylene bond, an amide bond, or an ester bond, and n is an integer of 1 or more. Among the materials represented by the general formula given above, the materials having n of 3 or more in the general formula tends to form a stable amorphous structure having a glass transition temperature of at least 25° C.

Also, among the charge accumulating materials, the inorganic materials include, for example, metals such as Au, Al and Se; alloys of these metals; semiconductors such as Si and C; and dielectrics such as S and SiC.

These charge accumulating materials can be used singly or in the form of a mixture of at least two of these materials. It is also possible to disperse these materials in various matrixes. It is desirable to use an electrically insulating polymers as the matrix in which these charge accumulating materials are dispersed.

As described above, the charge injection into the charge accumulating region is performed in the present invention by utilizing the phenomenon that the electrical resistance of the photoconductive region is lowered by the light irradiation, making it possible to inject the charge into the charge accumulating region by a relatively low voltage.

Also, since the resistance of the photoconductive region is higher during non-irradiation with light than that during the light irradiation, the charge injected into the charge accumulating region is scarcely discharged to the outside during non-irradiation with light. It follows that, in the present invention, it is possible to achieve a high density recording with a relatively low voltage. In other words, the present invention provides a recording medium, a recording apparatus and a recording method capable of achieving a super high density recording and capable of recording the information with a relatively low voltage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording medium, comprising:
   a substrate;
   a recording layer overlying the substrate and having a plurality of charge accumulating regions each containing a first material capable of accumulating an electric charge;
   at least one electrically insulating region which electrically insulates said plurality of charge accumulating regions from each other; and
   a photoconductive layer formed on the recording layer and on the at least one electrically insulating region and having a photoconductive region containing a second material whose conductivity is increased by light absorption.

2. The recording medium according to claim 1, further comprising:
   a conductive layer interposed between the substrate and the recording layer; and
   an insulating layer interposed between the conductive layer and the recording layer.

3. The recording medium according to claim 1, wherein said recording layer has a structure that said plural charge accumulating regions and said at least one electrically insulating region are juxtaposed to each other overlying said substrate.

4. The recording medium according to claim 1, wherein said recording layer has a dispersing medium and said plural charge accumulating regions dispersed in said dispersing medium and said at least one electrically insulating region constitutes at least a part of said dispersing medium.

5. The recording medium according to claim 1, wherein said recording layer has an insulating layer having a plurality of recessed portions on the surface thereof as said at least one electrically insulating region and has a structure that said recessed portions are filled with said plural charge accumulating regions.

6. The recording medium according to claim 1, wherein said second material is a material whose conductivity is non-linearly changed in accordance with intensity of light irradiating said second material.

7. A recording medium, comprising:
   a substrate;
   a conductive layer overlying the substrate;
   a photoconductive layer overlying the conductive layer and containing a second material whose conductivity is increased by light absorption; and
   a recording layer formed on the photoconductive layer and having a plurality of charge accumulating regions each containing a first material capable of accumulating an electric charge; and
   an electrically insulating region which electrically insulates said plural charge accumulating regions from each other and is provided with a plurality of through-holes, the through-holes being filled with the charge accumulating regions.

8. The recording medium according to claim 7, wherein said second material is a material whose conductivity is non-linearly changed in accordance with intensity of light irradiating said second material.

9. A recording medium, comprising:
   a substrate; and
   a recording layer overlying the substrate and comprising an electrically insulating region, a plurality of charge accumulating regions dispersed in the electrically insulating region and each containing a first material capable of accumulating an electric charge, and a plurality of photoconductive regions dispersed in the electrically insulating region and each containing a second material whose conductivity is increased by light absorption.

10. The recording medium according to claim 9, further comprising:
    a conductive layer interposed between said substrate and said recording layer; and
    an insulating layer interposed between said conductive layer and said recording layer.

11. The recording medium according to claim 9, wherein said second material is a material whose conductivity is non-linearly changed in accordance with intensity of light irradiating said second material.

12. A recording apparatus, comprising:
    a recording medium comprising a substrate and a recording layer overlying the substrate and having a plurality of charge accumulating regions each containing a first material capable of accumulating an electric charge, said recording layer further comprising (i) at least one electrically insulating region which electrically insulates said plurality of charge accumulating regions from each other and (ii) a photoconductive region containing a second material whose conductivity is increased by light absorption, and said recording medium further comprising a photoconductive layer in contact with the recording layer and having the photoconductive region; and
    a recording head arranged to face the main surface of said recording medium and comprising a light emitting section emitting light toward the recording layer when writing information and an electrode being adjacent to said light emitting section and utilized in injecting an electric charge into at least one of said plural charge accumulating regions.

13. The recording apparatus according to claim 12, wherein said light emitting section emits a near field light as said light.

14. The recording apparatus according to claim 12, further comprising a reproducing head arranged to face said recording medium and reading information corresponding to the amount of charge accumulated in said plural charge accumulating regions.

15. The recording apparatus according to claim 12, wherein said recording medium has a laminate structure of said recording layer overlying said substrate and said photoconductive layer formed on the recording layer.

16. The recording apparatus according to claim 12, wherein said recording medium further comprises a conductive layer and has a structure that said conductive layer overlying said substrate, said photoconductive layer is formed on said conductive layer, and said recording layer is formed on said photoconductive layer.

17. The recording apparatus according to claim 15, wherein said recording medium further comprises:
   a conductive layer interposed between the substrate and the recording layer; and
   an insulating layer interposed between the conductive layer and the recording layer.

18. A recording method of recording information by injecting an electric charge into a charge accumulating region containing a first material capable of accumulating the charge, comprising:

providing the charge accumulating region with a plurality of charge accumulating regions and at least one electrically insulating region which electrically insulates said plurality of charge accumulating regions from each other;

irradiating a photoconductive region arranged in contact with said charge accumulating region and containing a second material whose conductivity is increased by light absorption with light; and injecting the electric charge into said charge accumulating region via a portion of the photoconductive region irradiated with light.

* * * * *